United States Patent [19]
Lee

[11] 3,834,865
[45] Sept. 10, 1974

[54] DOLLY STRUCTURE
[75] Inventor: Robert E. Lee, Huntington, Ind.
[73] Assignee: Lincoln Manufacturing Company, Inc., Fort Wayne, Ind.
[22] Filed: Mar. 7, 1973
[21] Appl. No.: 338,885

[52] U.S. Cl.................... 432/241, 312/236, 432/137
[51] Int. Cl............................................. F27b 9/26
[58] Field of Search.............. 126/21, 19, 268, 276; 432/137, 241; 312/320, 250, 311, 236, 237

[56] References Cited
UNITED STATES PATENTS
3,261,650  7/1966  Stromquist....................... 126/21 A
3,719,408  3/1973  Fullington et al.................. 312/236
3,752,550  8/1973  Neimeyer........................ 312/250 X
3,759,661  9/1973  Barsby............................... 432/241

Primary Examiner—Edward G. Favors
Attorney, Agent, or Firm—Albert L. Jeffers; Roger M. Rickert

[57] ABSTRACT

A dolly structure, especially a portable dolly structure adapted to be rolled into and out of an oven enclosure to form the bottom thereof and adapted to support trays which carry sealed food packets which are heated in the oven enclosure and which are thereafter moved to a serving location while still carried on the dolly structure.

6 Claims, 4 Drawing Figures

DOLLY STRUCTURE

The present invention relates to a dolly structure and is particularly concerned with a dolly structure especially adapted for receiving stacks of wire trays, or baskets, in which are sealed packets of food. The dolly structure, together with the baskets thereon carrying the food packets, can be moved into an oven for the heating of the packets and, thereafter, the unit consisting of the dolly structure and the baskets stacked thereon and the food packets in the baskets can be moved to a serving point.

Central food preparation installations are known and are used to considerable advantage in connection with institutions such as schools. In such a system, each school determines its requirements for lunch and notifies the central food preparation installation, whereupon the lunch requirements are made up. The lunch requirements may include a packet of food which is to be heated just prior to serving. These packets of food, which are uniform in size and shape, may be in the form of disposable individual containers, or packets with thin foil tear-off covers thereon so that the prepared food is sealed in the respective containers. The sealed containers, or packets, are arranged in tray-like baskets of a suitable size for receiving a certain number of the packets in side by side and end to end relation and the baskets are adapted for being stacked one on the other while holding the packets in vertically spaced relation. The baskets are wire-like members so that hot air can be passed through the stacked baskets, thereby to heat the packets of food carried by the baskets.

As mentioned, the packets of food are prepared and placed in baskets in the central installation where the food is prepared and the baskets are then stacked up on dollys which are constructed in accordance with the present invention.

The dollys with the baskets thereon having packets of food therein can be refrigerated and can be moved as units by a refrigerated van to the places of use. At the places of use there is an oven structure, preferably, a compact portable oven, into which at least one dolly can be rolled and in which the packets of food in the baskets on the dolly are heated by blowing heated air over and through the stack of baskets on the dolly. When the food packets are heated to the desired degree, the dolly, together with the baskets stacked thereon is moved out of the oven to a serving point and the individuals to be served then file past the dolly and remove the packets of food therefrom one by one.

As mentioned, the system very briefly described above has proved to be a time and labor saver and is pacticed widely. The present invention is particularly concerned with a novel and improved dolly structure, especially adapted for use in such a system.

An object of the present invention is the provision of a dolly structure of the nature referred to which can be fabricated quite easily and quite inexpensively.

Another object of the present invention is the provision of a dolly structure of the nature referred to which embodies heat insulation at the bottom, thereby inhibiting loss of heat during heating of the products, or packets, in the oven and also during serving.

Another object of the present invention is the provision of a dolly of the nature referred to in which at least the upwardly facing top surface of the dolly is polished and is, furthermore, preferably formed of stainless steel, thereby providing for the best heat reflecting and lowest conducting conditions.

A still further object is the provision of a dolly of the nature referred to which is of standard construction and which can be used not only in ovens for heating packets of food carried in baskets mounted on the dolly, but can also be employed for supporting trays, or baskets, containing other foods, for example, cold food packets as well.

A further object is the provision of a dolly structure of the nature referred to which permits a plurality of the dollys to be provided and without any great additional cost whereby large quantities of food can be handled expeditiously.

A particular object is the provision of a dolly of the nature referred to which can form the bottom wall of the oven in which food packets carried by the dolly are heated.

The foregoing objects as well as other objects and advantages of the present invention will become more apparent upon reference to the following detailed specification taken in connection with the accompanying drawings in which.

BRIEF SUMMARY OF THE INVENTION

Figure 1:
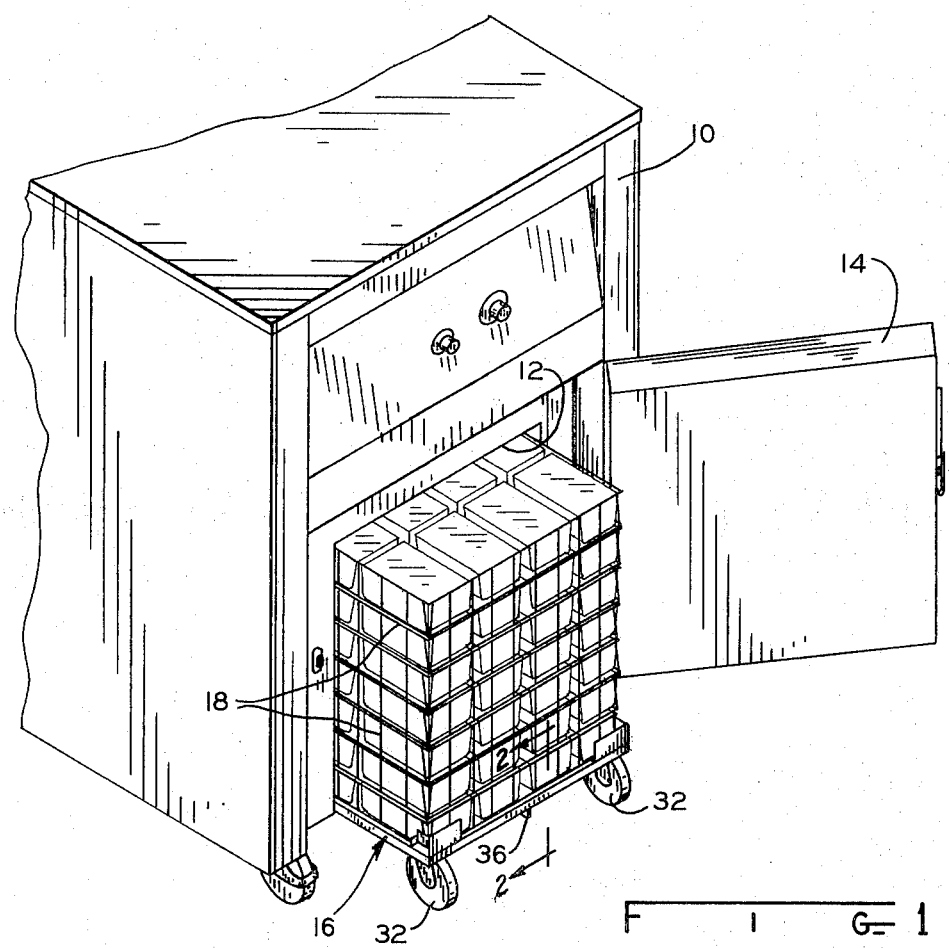
FIG. 1 is a somewhat schematic perspective view showing an oven in which a dolly is to be heated and also showing a dolly partway in the oven.

According to the invention, a dolly structure is provided consisting of two pan-like elements having the peripheral flanges extending in the same direction and telescopically engaged and interconnected as by spot welding, while a layer or block of heat insulating material is interposed between the members.

The lower member has caster wheels so that the dolly can be moved about, while at the corners of the upper member are upstanding channels, or spacer members, which serve to locate and confine the lowermost basket to be mounted on the dolly. The channels furthermore hold the basket up off the top surface of the dolly so that hot oven air can pass beneath the basket. Further channel members can be provided on the top of the dolly member for added support for the lowermost basket thereon.

Extending longitudinally along the bottom of the dolly member is an angle having apertures in the ends so that the dolly can be engaged by a hook to move it about.

All of the parts of the dolly may be secured together as by spot welding and the upper member forming the upwardly facing part of the dolly is preferably formed of stainless steel and at least the upper face thereof is highly polished so that the surface is heat reflective.

DETAILED DESCRIPTION OF THE INVENTION:

In the drawings, 10 indicates an oven enclosure, which is schematically illustrated, and which has top, side, back and front walls with an opening 12 formed in the front wall and adapted for being closed by a door 14. The opening 12 is adapted for receiving a dolly structure generally indicated at 16, and on which is stacked a plurality of baskets 18 with each basket having sealed packets of food mounted therein. Contained within the oven is heating means and a blower means. The heating means heats air and the blower means blows it over and through the baskets in order to heat the packets of food carried thereby. Suitable controls are provided for the oven to regulate the temperatures and the duration of the heating cycle thereof.

An oven structure of the nature referred to is illustrated in the copending U.S. application, Ser. No. 853,339, Filed: Aug. 27, 1967 in the name of Robert H. MacKay and Delmar D. Rhoads, and assigned to the same Assignee as the instant application. The details of the oven structure, per se, form no part of the present invention which is concerned with the dolly structure except the dolly structure, when in the oven, forms the bottom closure wall of the heated space.

Figure 2:
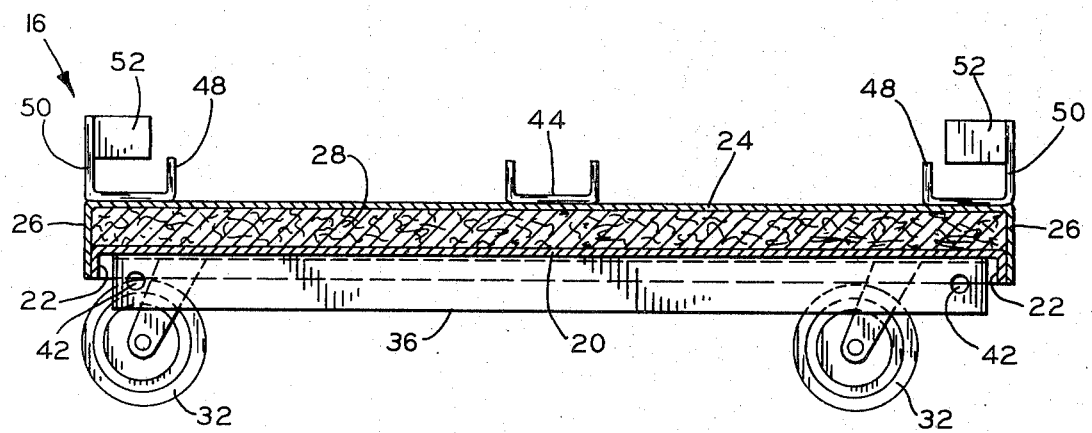
FIG. 2 is a longitudinal vertical section through the dolly structure and is indicated by line 2—2 on FIG. 1.
Figure 3:
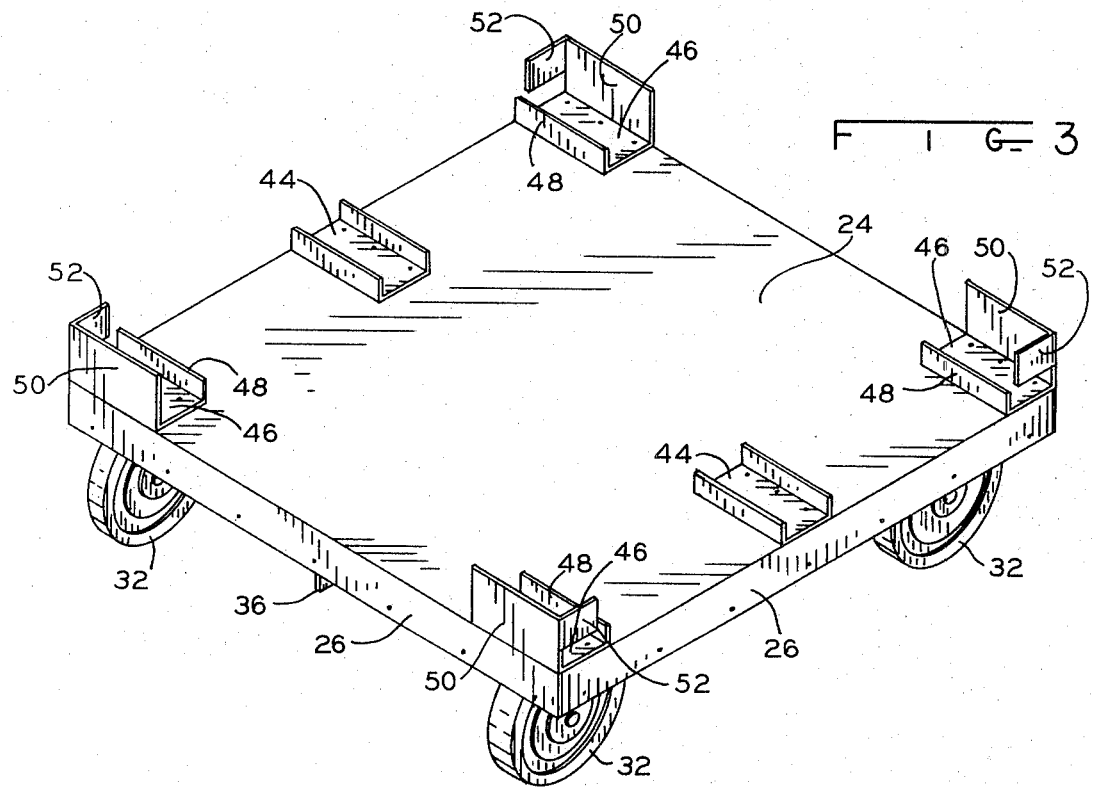
FIG. 3 is a perspective view looking down on the top of the dolly.

FIG. 2 will show that the dolly structure comprises a lower member 20 having a peripheral flange 22 dependant from the periphery thereof and an upper member 24 having a somewhat longer peripheral flange 26 dependant from the periphery thereof. The members 20 and 24 are adapted for being disposed in telescopic engagement, as illustrated, with heat insulating material 28 interposed therebetween.

The lower member 20 may be of about 18 gauge material and is treated with rust resisting material. The upper member 24, on the other hand, is about 16 gauge material and is preferably formed of stainless steel. The upper surface of member 24 is also polished to a smooth heat reflective surface. The telescopically engaged flanges 22 and 26 are fixably interconnected as by a series of spot welds.

Figure 4:
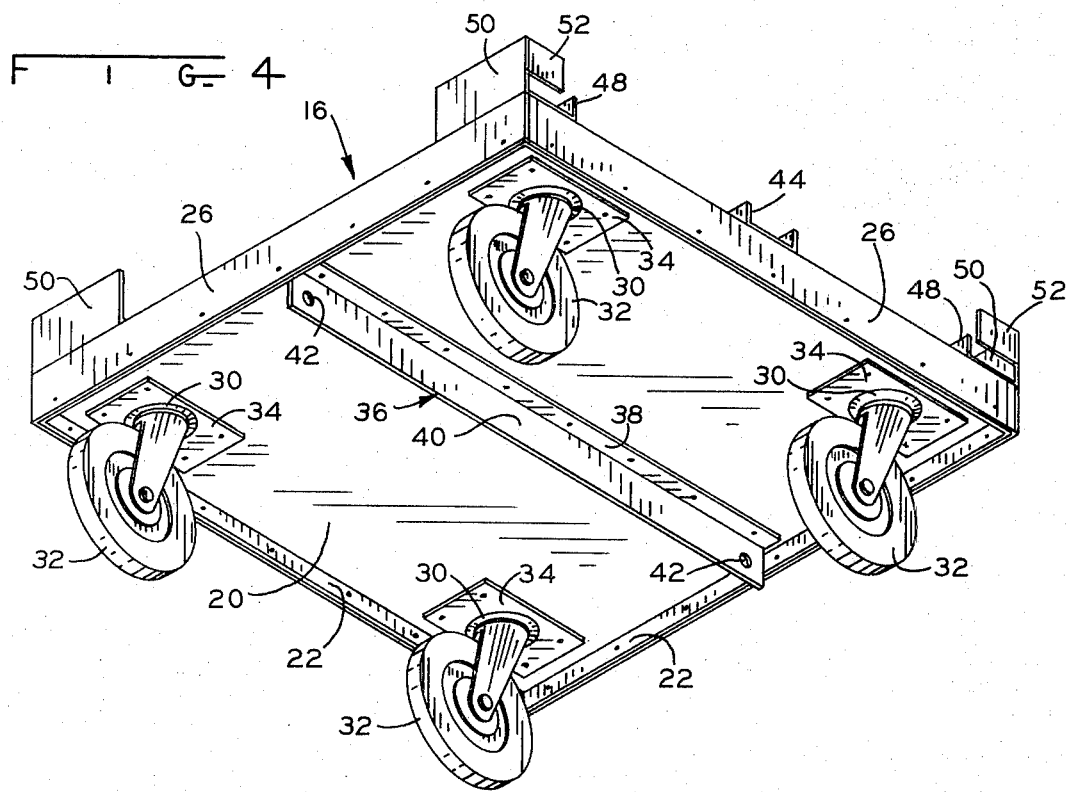
FIG. 4 is a perspective view looking up from beneath the dolly.

As will be seen in FIGS. 2 and 4 there is secured to each corner of bottom member 20 on the lower side thereof a caster wheel 30 which has rubber-like wheels, or rubber-like covering on the wheels, as indicated at 32 consisting of temperature resistant material, such as silicone rubber, or the like. The flat supporting members 34 for the caster wheels are preferably spot welded to the underside of member 20.

Extending longitudinally of the dolly and also secured to the underside of member 20 is an angle 36 having a shorter leg 38 that is spot welded to the underside of member 20. The longer leg 40 of angle 36 depends downwardly beneath the lower edge of flanges 22 and 26 and is provided with apertures 42 which can be engaged by a pull hook for moving the dolly about.

On the upper side of member 24, there is provided a plurality of basket supporting channel members. A pair of these channel members are indicated at 44, are in about the middle of the length of the dolly and are at the sides thereof and are upwardly opening. These members are advantageously formed of about 14 gauge stainless steel and are spot welded to the upper surface of the top member 24.

At each corner of the dolly is a further cleat or channel member 46 having one leg 48 toward the inside of the top surface of the dolly member and the same height as the upstanding legs of channel members 44. Channel members 46 have a longer leg 50 upstanding therefrom and substantially in the plane of an end of the dolly and from which legs 50, toward the outside of the dolly, there are provided the tabs 52 substantially in the planes of the sides of the dolly.

The legs 50 and tabs 52 serve as locating means to locate at least the lowermost basket disposed on the dolly, while channels 44 and legs 48 of channels 46 provide support therefor. The channels 46 are also advantageously formed of about 14 gauge stainless steel and are spot welded in the positions shown in the drawings on the top member 24.

The dolly, constructed as illustrated, is easy to manufacture, is sturdy, is easy to keep in a clean and sanitary condition, is convenient to move about, and is so constructed that the baskets stacked thereon will not shift longitudinally or laterally thereof.

Furthermore, the member 24 can be formed of stainless steel and can be highly polished on top and is thereby made heat reflective. The dolly serves as a heat insulating bottom wall for the oven when it is inserted therein and also inhibits heat loss toward the bottom from food packets in the baskets mounted thereon.

While certain materials have been referred to from which the dolly is made, it will be understood that the specific materials referred to and the specific construction procedures mentioned are not to be considered as limiting. For example, the dolly could be formed of aluminum of a suitable strength and the connection of the parts together could be by way of bolts, screws, or rivets, as well as by the spot welding referred to.

Modifications may be made within the scope of the appended claims.

What is claimed is:

1. A mobile dolly structure being movable into and out of an oven and forming the bottom of the heated space in the oven, said dolly structure having a horizontal lower member substantially rectangular in shape when viewed from above, wheel members secured to and dependent from the underside of said lower member for the rolling support of said dolly structure, an upper member supported in vertically spaced parallel relation to the lower member, heat insulating material interposed between the said upper and lower members, said upper member being formed of stainless steel with the upwardly facing side being smoothly polished to a heat reflective finish, spacer members mounted on the upper side of said upper member in distributed relation and upstanding therefrom to support basket means on said upper member in spaced relation to the upper side of said upper member, and cleat means mounted on the upper side of said upper portion and upstanding therefrom in distributed relation near the edges thereof and engageable with the sides of the basket means supported on said spacer members to prevent shifting of the basket means in the horizontal direction on said upper member.

2. A mobile dolly structure being movable into and out of an oven and forming the bottom of the heated space in the oven, said dolly structure having a horizontal lower member substantially rectangular in shape when viewed from above, wheel members secured to and dependent from the underside of said lower member for the rolling support of said dolly structure, an upper member supported in vertically spaced parallel relation to the lower member, heat insulating material interposed between the said upper and lower members, each of said members being provided with a dependent peripheral flange, the flange of the upper member telescoping over the flange of the lower member, said flanges being fixedly interconnected, said insulating material being confined by said members and the said flange on the upper member, spacer members mounted on the upper side of said upper member in distributed relation and upstanding therefrom to support basket means on said upper member in spaced relation to the upper side of said upper member, and cleat means mounted on the upper side of said upper portion and upstanding therefrom in distributed relation near the edges thereof and engageable with the sides of the basket means supported on said spacer members to prevent shifting of the basket means in the horizontal on said upper member.

3. A mobile dolly structure according to claim 2 in which said cleat means comprises cleat members fixed to the upper side of said upper member near the corners thereof and each including an upstanding first leg portion spaced inwardly from an edge of said upper member and terminating at the top in about the same horizontal plane as the spacer members to cooperate with said spacer members in supporting the basket means, each said cleat member comprising a second leg portion upstanding substantially in the vertical plane of an edge of said upper member and terminating at the top at a level substantially above said horizontal plane.

4. A mobile dolly structure according to claim 3 in which each second leg portion has one end disposed substantially in vertical alignment with a respective corner of said upper member, and a tab member fixed at one end to said end of each second leg portion and projecting angularly from the respective second leg portion substantially in the vertical plane of an edge of said upper member.

5. A mobile dolly structure according to claim 1 which includes engageable means secured to and dependent from the underside of said lower member and providing pull hook engageable regions at opposite ends of said lower member.

6. A mobile dolly structure according to claim 5 in which said engageable means comprise a bar member secured to and dependent from the underside of said lower member and extending substantially from one end of said lower member to the opposite end thereof in a direction parallel to a pair of opposite side edges of said lower member and about midway therebetween, said bar member having an aperture therein near each end thereof for engagement by a pull hook for movement of said dolly structure on the wheel members thereof.

* * * * *